Feb. 12, 1924.

L. J. PERKINS

WHEEL

Filed Sept. 21, 1921

1,483,478

Inventor
L. J. Perkins
By C. A. Snow & Co.
Attorney

Patented Feb. 12, 1924.

1,483,478

UNITED STATES PATENT OFFICE.

LOUIS J. PERKINS, OF LEWISTON, IDAHO.

WHEEL.

Application filed September 21, 1921. Serial No. 502,098.

*To all whom it may concern:*

Be it known that I, LOUIS J. PERKINS, a citizen of the United States, residing at Lewiston, in the county of Nez Perce and State of Idaho, have invented new and useful Wheels, of which the following is a specification.

This invention has reference to wheel constructions, and more particularly to a novel form of wheel used in connection with motor vehicles, the primary object of the invention being to provide a wheel including separable sections to facilitate the mounting and demounting of the tire.

A further object of the invention is to provide a tire formed of a single casing, eliminating the necessity of providing an inner tube in connection therewith, the sections of the wheel being such as to hold adjacent edges at the base of a casing, in close engagement with each other.

A still further object of the invention is to provide means to be attached to the wheel to widen the tread or periphery thereof, thus adapting the wheel for use on soft or muddy surfaces.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
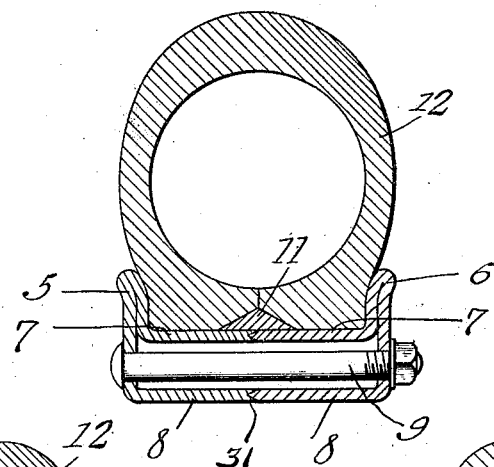
Figure 1 is a sectional view through the rim of a wheel constructed in accordance with the present invention showing a tire as applied thereto.

Referring to the drawing in detail, the rim embodies a section 5 and the section 6, each of the sections being formed of a strip of metal formed into a pair of spaced flanges 7 and 8 respectively, the inner edges of the flanges of the section 5 being grooved to accommodate the tapered extremities of the flanges of the adjacent section 6. Each of the sections is provided with openings arranged in spaced relation with each other and disposed circumferentially of the rim in spaced relation with the outer edges of the sections 5 and 6. These openings are disposed opposite each other to accommodate the securing bolts 9 which secure the sections together, and it is to be understood that when the sections are secured as shown by Figure 1 of the drawings, the rim is in a condition to be placed on a motor vehicle wheel.

Figure 2:
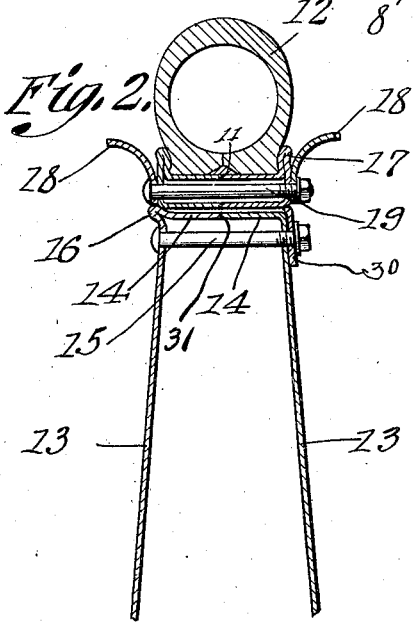
Figure 2 is a sectional view through a wheel showing the flanges as applied thereto.

In the form of the invention as illustrated by Figure 2 of the drawing, the wheel is shown, which is formed of opposed disks 13, each of which being provided with an inwardly extending flange 14, which flanges interlock and are secured in such locked position by means of the bolt 15 extending circumferentially thereof.

A circumferential flange indicated at 16 is provided at one edge of the wheel and forms an abutment for the demountable rim 17 constructed in the same manner as that shown by Figure 1 of the drawing, with the exception that the flanges 18 are provided, which flanges are curved outwardly and extend circumferentially of the wheel to provide an auxiliary tread adapting the wheel for use on soft or muddy surfaces. It is to be understood that these flanges 18 are used preferably when wheels are to be mounted on trucks or other heavy vehicles.

Figure 3:
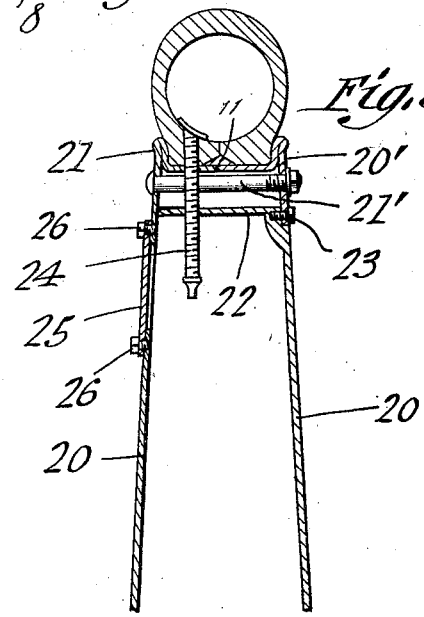
Figure 3 is a modified form of wheel construction.

In the form of the invention as shown by Figure 3 of the drawing, the construction includes a pair of disks 20, one disk having one edge thereof extending inwardly and formed into circumferential flanges 21. The free edge of the disk provided with the flanges 21 extends downwardly to provide a wall, which wall is connected to the main wall of the disk of which the same forms a part, by means of the spaced bolts 21′.

The opposite disk is provided with a recessed portion to accommodate the downwardly extending flange 20′ of the disk associated therewith, the same being secured within the recessed portion as by means of the bolts 23. A bracket member 22 extends inwardly from one of the disks 20, the bracket member being apertured to accommodate the valve stem 24 to hold the valve stem in its proper position at all times. One of the disks 20 is provided with a lateral opening which is normally closed as by means of the closure 25, which closure is secured to the disks through the medium of the bolts 26.

The tire indicated at 12 forms an important feature of the invention and embodies a casing constructed in the usual and well known manner, the abutting edges of the casing however being brought together where the same are vulcanized and reinforced by the triangular shaped rubber element 11. After the element 11 has been positioned, the same is again vulcanized making the casing air-tight and eliminating the use of a tube.

It might be further stated that securing lugs 30 are employed in connection with the disks 13 for contacting with the removable rim section for holding the same on the wheel. From the foregoing it will be seen that when it is desired to remove a tire, it is only necessary to remove the bolts 21 and 23 and lift off flanges 20′.

The disks are now disconnected, whereupon the tire may be readily positioned on one section, the opposite section being brought into engagement with the first section, where the same may be bolted together. It follows that upon positioning a tire, it is only necessary to stretch the tire over the usual circumferential flanges of the rim to accomplish the positioning thereof.

In order that a close fit will be had between the contacting edges of the adjacent flanges 7, one of the flanges is provided with a groove, while the opposite flange is provided with a beveled edge to be positioned within the groove, as indicated at 31.

Having thus described the invention, what is claimed as new is:—

A separable wheel comprising opposed members, each of said opposed members including a pair of inwardly extending circular flanges, the inner edges of the flanges of one member being formed with grooves, the inner edges of the opposite flanges being formed with tongues to fit within the grooves, and means disposed between the flanges of the members for holding the members in their active positions.

In testimony that I claim the foregoing as my own, I have hereto affixed my signature in the presence of two witnesses.

LOUIS J. PERKINS.

Witnesses:
 EUGENE O'NEILL,
 SAMMUEL H. ROOT.